United States Patent
Vu et al.

(10) Patent No.: US 10,225,280 B2
(45) Date of Patent: Mar. 5, 2019

(54) SYSTEM AND METHOD FOR VERIFYING AND DETECTING MALWARE

(71) Applicant: Cyphort Inc., Santa Clara, CA (US)

(72) Inventors: Neal Vu, San Jose, CA (US); Frank Jas, Scotts Valley, CA (US); Fengmin Gong, Livermore, CA (US); Anthony James, San Jose, CA (US); Ali Golshan, Santa Clara, CA (US); Shishir Singh, Cupertino, CA (US)

(73) Assignee: Cyphort Inc., Santa Clara, CA (US)

( * ) Notice: Subject to any disclaimer, the term of this patent is extended or adjusted under 35 U.S.C. 154(b) by 0 days.

(21) Appl. No.: 14/629,435

(22) Filed: Feb. 23, 2015

(65) Prior Publication Data

US 2015/0244730 A1    Aug. 27, 2015

Related U.S. Application Data (60) Provisional application No. 61/944,006, filed on Feb. 24, 2014, provisional application No. 62/079,524, filed on Nov. 13, 2014.

(51) Int. Cl.
| | |
|---|---|
| *G06F 21/55* | (2013.01) |
| *H04L 29/06* | (2006.01) |
| *G06F 21/56* | (2013.01) |

(52) U.S. Cl.
CPC .......... *H04L 63/145* (2013.01); *G06F 21/55* (2013.01); *G06F 21/561* (2013.01); *G06F 21/566* (2013.01)

(58) Field of Classification Search
CPC .............................. G06F 21/55; H04L 63/145
See application file for complete search history.

(56) References Cited

U.S. PATENT DOCUMENTS

| | | | |
|---|---|---|---|
| 7,418,729 B2 | 8/2008 | Szor | |
| 7,540,030 B1 | 5/2009 | Zaitsev | |
| 7,664,626 B1 | 2/2010 | Ferrie | |
| 7,721,331 B1 * | 5/2010 | Rowe | G06F 21/56 709/221 |
| 7,725,937 B1 | 5/2010 | Levy | |
| 8,060,074 B2 | 11/2011 | Danford et al. | |
| 8,108,912 B2 | 1/2012 | Ferris | |
| 8,151,352 B1 | 4/2012 | Novitchi | |
| 8,176,477 B2 | 5/2012 | Wu | |
| 8,204,984 B1 | 6/2012 | Aziz et al. | |
| 8,256,598 B2 | 9/2012 | Seshardi et al. | |
| 8,375,444 B2 | 2/2013 | Aziz et al. | |
| 8,375,450 B1 | 2/2013 | Oliver et al. | |
| 8,407,797 B1 | 3/2013 | Novitchi | |

(Continued)

OTHER PUBLICATIONS

Extended European Search Report in European Application No. 16167215.9, dated Sep. 28, 2016.

(Continued)

*Primary Examiner* — Jason Chiang
(74) *Attorney, Agent, or Firm* — Harrity & Harrity, LLP (57) ABSTRACT

A system configured to detect malware is described. The system including an infection verification pack configured to perform behavior detonation; identify a malware object based on machine-learning; and select one or more persistent artifacts of the malware on the target system based on one or more algorithms applied to behavior traces of the malware object to select one or more persistent artifacts of the malware on the target system.

20 Claims, 4 Drawing Sheets

(56) References Cited

U.S. PATENT DOCUMENTS

| | | | |
|---|---|---|---|
| 8,516,589 | B2 | 8/2013 | Jeong et al. |
| 8,555,385 | B1* | 10/2013 | Bhatkar ............... G06F 21/556 |
| | | | 726/22 |
| 8,745,734 | B1 | 6/2014 | Brandwine et al. |
| 8,751,490 | B1 | 6/2014 | Cooley |
| 8,769,683 | B1* | 7/2014 | Oliver .................. G06F 21/561 |
| | | | 719/311 |
| 8,862,739 | B2 | 10/2014 | Brownlow et al. |
| 8,881,289 | B2 | 11/2014 | Basavapatna et al. |
| 8,984,581 | B2 | 3/2015 | Luna et al. |
| 9,519,781 | B2 | 12/2016 | Golshan et al. |
| 9,686,293 | B2 | 6/2017 | Golshan et al. |
| 2005/0081053 | A1 | 4/2005 | Aston et al. |
| 2006/0010440 | A1 | 1/2006 | Anderson et al. |
| 2006/0161982 | A1 | 7/2006 | Chari et al. |
| 2007/0244987 | A1 | 10/2007 | Pedersen et al. |
| 2007/0250930 | A1 | 10/2007 | Aziz et al. |
| 2008/0016570 | A1 | 1/2008 | Capalik |
| 2008/0086776 | A1 | 4/2008 | Tuvell et al. |
| 2008/0216175 | A1 | 9/2008 | Pike |
| 2009/0077544 | A1 | 3/2009 | Wu |
| 2010/0064299 | A1 | 3/2010 | Kacin et al. |
| 2010/0115621 | A1 | 5/2010 | Staniford et al. |
| 2010/0192223 | A1 | 7/2010 | Ismael et al. |
| 2011/0041179 | A1 | 2/2011 | Stahlberg |
| 2011/0054879 | A1 | 3/2011 | Bogsanyl et al. |
| 2011/0055123 | A1 | 3/2011 | Kennedy |
| 2011/0138470 | A1* | 6/2011 | Davis .................... G06F 21/564 |
| | | | 726/25 |
| 2011/0138471 | A1 | 6/2011 | Van De Weyer et al. |
| 2011/0145926 | A1 | 6/2011 | Dalcher et al. |
| 2011/0167494 | A1 | 7/2011 | Bowen et al. |
| 2011/0225655 | A1 | 9/2011 | Niemela et al. |
| 2011/0247072 | A1* | 10/2011 | Staniford ............ H04L 63/1416 |
| | | | 726/24 |
| 2011/0271343 | A1 | 11/2011 | Kim et al. |
| 2011/0302656 | A1* | 12/2011 | El-Moussa .......... H04L 63/1425 |
| | | | 726/24 |
| 2012/0011590 | A1 | 1/2012 | Donovan |
| 2012/0110672 | A1 | 5/2012 | Judge et al. |
| 2012/0272317 | A1 | 10/2012 | Rubin et al. |
| 2013/0097701 | A1 | 4/2013 | Moyle et al. |
| 2013/0097706 | A1 | 4/2013 | Titonis et al. |
| 2013/0117848 | A1 | 5/2013 | Golshan et al. |
| 2013/0117849 | A1 | 5/2013 | Golshan et al. |
| 2013/0227691 | A1* | 8/2013 | Aziz ...................... G06F 21/567 |
| | | | 726/24 |
| 2013/0263260 | A1 | 10/2013 | Mahaffey et al. |
| 2013/0276114 | A1 | 10/2013 | Friedrichs et al. |
| 2013/0298244 | A1 | 11/2013 | Kumar et al. |
| 2013/0303159 | A1* | 11/2013 | Gathala ............... G06F 11/3013 |
| | | | 455/425 |
| 2013/0312096 | A1* | 11/2013 | Larsen ................. G06F 9/45558 |
| | | | 726/24 |
| 2013/0318568 | A1 | 11/2013 | Mahaffey et al. |
| 2014/0090061 | A1* | 3/2014 | Avasarala .............. G06F 21/56 |
| | | | 726/24 |
| 2014/0096251 | A1 | 4/2014 | Doctor et al. |
| 2015/0007312 | A1* | 1/2015 | Pidathala ............. H04L 63/145 |
| | | | 726/22 |
| 2015/0106927 | A1 | 4/2015 | Ferragut et al. |
| 2015/0128263 | A1* | 5/2015 | Raugas ............... H04L 63/1408 |
| | | | 726/23 |
| 2015/0135262 | A1 | 5/2015 | Porat et al. |
| 2015/0172300 | A1* | 6/2015 | Cochenour ......... H04L 63/1425 |
| | | | 726/23 |
| 2015/0180883 | A1* | 6/2015 | Aktas ................... H04L 63/145 |
| | | | 726/23 |
| 2015/0205954 | A1 | 7/2015 | Jou et al. |
| 2015/0244732 | A1 | 8/2015 | Golshan et al. |
| 2015/0319185 | A1 | 11/2015 | Kirti et al. |
| 2015/0373039 | A1 | 12/2015 | Wang |
| 2016/0019388 | A1 | 1/2016 | Singla et al. |
| 2016/0065601 | A1 | 3/2016 | Gong et al. |
| 2016/0078229 | A1 | 3/2016 | Gong et al. |
| 2016/0212165 | A1 | 7/2016 | Singla et al. |
| 2016/0373478 | A1 | 12/2016 | Doubleday et al. |

OTHER PUBLICATIONS

International Search Report and Written Opinion in International Application No. PCT/US2016/061199, dated Feb. 6, 2017.
International Search Report and Written Opinion in International Application No. PCT/US2016/061201, dated Feb. 7, 2017.
Notice of Allowance in U.S. Appl. No. 14/629,444, dated Nov. 4, 2016.
Supplemental Notice of Allowance in U.S. Appl. No. 14/629,444, dated Feb. 16, 2017.
Office Action in U.S. Appl. No. 13/288,917, dated Mar. 21, 2017.
Office Action in U.S. Appl. No. 14/936,593, dated Apr. 7, 2017.
Office Action in U.S. Appl. No. 14/936,612, dated Apr. 21, 2017.
Supplemental Notice of Allowance in U.S. Appl. No, 13/288,905, dated Sep. 6, 2016.
Notice of Allowance in U.S. Appl. No. 13/288,917, dated Aug. 11, 2017.
Bayer, Ulrich, "TTAnalyze: A Tool for Analyzing Malware", Master's Thesis, Technical University of Vienna, Dec. 12, 2005.
Cavallaro, Lorenzo et al., "Anti-Taint-Analysis: Practical Evasion Techniques Against Information Flow Based Malware Defense", Secure Systems Lab at Stony Brook University, Tech, Rep, pp. 1-18, Nov. 2007.
Chen, Xu et al., "Towards an Understanding of Anti-Virtualization and Anti-Debugging Behavior in Modern Malware," In Proceedings of the 38th Annual IEEE International Conference on Dependable Systems and Networks (DSN), Jun. 24, 2008.
Ho, Alex et al., "Practical Taint-Based Protection Using Demand Emulation", EuroSys '06, Proceedings of the 1st ACM SIGOPS/EuroSys European Conference on Computer Systems 2006, vol. 40, Issue 4, pp. 29-41, Oct. 2006.
Kang, Min Gyung et al., "Emulating Emulation-Resistant Malware," In Proceedings of the Workshop on Virtual Machine Security (VMSec), Nov. 9, 2009.
Zhang, Xiao-Song et al., "A Practical Taint-Based Malware Detection", ICACIA 2008, International Conference on Apperceiving Computing and Intelligence Analysis, pp. 73-77, Dec. 2008.
Extended European Search Report in European Application No, 12844780.2, dated Jul. 22, 2015.
Extended European Search Report in European Application No. 12845692.8, dated Oct. 8, 2015.
International Preliminary Report on Patentability in International Application No. PCT/US2012/063566, dated May 15, 2014.
International Preliminary Report on Patentability in international Application No. PCT/US2012/063569, dated May 15, 2014.
International Search Report and Written Opinion in International Application No. PCT/US2012/063566, dated Jan. 22, 2013.
International Search Report and Written Opinion in International Application No. PCT/US2012/063569, dated Jan. 18, 2013.
International Search Report and Written Opinion in International Application No. PCT/US2015/017389, dated Dec. 11, 2015.
International Search Report and Written Opinion in International Application No. PCT/US2015/017394, dated Jun. 10, 2015.
Office Action in U.S. Appl. No. 13/288,905, dated May 21, 2013.
Office Action in U.S. Appl. No. 13/288,905, dated Feb. 19, 2014.
Office Action in U.S. Appl. No. 13/288,905, dated Oct. 23, 2014.
Office Action in U.S. Appl. No. 13/288,905, dated Jun. 4, 2015.
Office Action in U.S. Appl. No. 13/288,905, dated Jan. 20, 2016.
Office Action in U.S. Appl. No. 13/288,917, dated Sep. 12, 2013.
Office Action in U.S. Appl. No. 13/288,917, dated Jun. 30, 2014.
Office Action in U.S. Appl. No. 13/288,917. dated Dec. 3, 2014.
Office Action in U.S. Appl. No. 13/288,917, dated Jul. 13, 2015.
Office Action in U.S, Appl. No. 13/288,917, dated Jun. 1, 2016.
Office Action in U.S. Appl. No. 14/629,444, dated Feb. 9, 2016.
Office Action in U.S. Appl. No. 14/629,444, dated Jun. 9, 2016.
Notice of Allowance in U.S. Appl. No. 13/288,905, dated Aug. 2, 2016.

(56) References Cited

OTHER PUBLICATIONS

International Preliminary Report on Patentability in International Application No. PCT/US2015/017389, dated Sep. 9, 2016.
International Preliminary Report on Patentability in International Application No. PCT/US2015/017394, dated Sep. 9, 2016.

* cited by examiner

SYSTEM AND METHOD FOR VERIFYING AND DETECTING MALWARE

CROSS-REFERENCE TO RELATED APPLICATIONS

This application claims priority from U.S. Provisional Patent Application No. 61/944,006, filed on Feb. 24, 2014 and U.S. Provisional Patent Application No. 62/079,524, filed on Nov. 13, 2014, each of which is hereby incorporated by reference in their entirety.

FIELD

Embodiments of the invention relate to protecting computers and networks from malicious software. In particular, embodiments of the invention relate to a system and method for detection malware based on shared intelligence.

BACKGROUND

As computer networks grow and the amount of data stored on computers and databases interconnected by those networks grows, so have attempts to gain unauthorized access to these computers and databases. Such attempts to gain unauthorized access to computers and databases may include methodical reconnaissance of potential victims to identify traffic patterns and existing defenses. A technique used to gain unauthorized access to computers and databases includes loading malicious software or malware onto a computer. Such malware is designed to disrupt computer operation, gather sensitive information, or to grant access to the computer to unauthorized individuals.

As the awareness of malware increases, the techniques used to load malware onto computers has grown more sophisticated. As a result, legacy security solutions that use a structured process (e.g., signature and heuristics matching) or analyze agent behavior in an isolated context fail to detect sophisticated techniques to load malware.

The failure to detect the loading of malware and sophisticated malware on a computer or network can result in loss of high value data, down time or destruction of infected computers and/or the networks, lost productivity, and a high cost to recover and repair the infected computers and/or networks.

SUMMARY

A system configured to detect malware is described. The system configured to perform behavior detonation; identify a malware object based on machine-learning; and select one or more persistent artifacts of the malware on the target system based on one or more algorithms applied to behavior traces of the malware object to select one or more persistent artifacts of the malware on the target system.

Other features and advantages of embodiments will be apparent from the accompanying drawings and from the detailed description that follows.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of an infection verification pack (IVP) system to detect malware are configured to inspect potentially malware-carrying objects of interest including performing behavior detonation; applying machine-learning based classification models to identify a malware object; applying one or more algorithms to behavior traces of the malware object to select one or more persistent artifacts from the infection of this malware on the target system; transforming the one or more persistent artifacts into a form that can be used to verify and detect infection by malware on a number of endpoint systems with different operating systems and software versions; and incorporating into a program one or more algorithms, which when run on any endpoint system along with the transformed artifacts (IVP input), will produce a "confirmed" or "unconfirmed" output. A "confirmed" output gives a positive verification (with respect to another indicator of infection) or detection (in absence of another indicator besides IVP) of the system by the malware in question.

A persistent artifact may include, but is not limited to, creation of a file and an addition of a registry key. Transforming a persistent artifact into a form that can be used to verify includes, but is not limited to, transforming a persistent artifact into one or more of a specification line, and a new file—for example "C:\trivax1.Bin\trivax1.Bin.exe", which indicates that a new file by the name "trivax1.Bin.exe" was created by malware and added to the C drive under a directory named "trivaz1.Bin." According to an embodiment, the selection of potentially malware-carrying objects is based on multiple factors, including vulnerabilities in applications that handle those objects, the types of computer systems used in a protected environment, and the security posture of the protected environment. An IVP system can be configured accordingly by considering these factors.

For an embodiment, detecting an infection by malware on a number of endpoint systems with different operating systems and software versions may include, for example, detecting the same application specific data dropped in different directories between Windows XP and Windows 7, e.g. "C:\Documents and Settings\Administrator\Application Data\hidn\hidn2.exe" versus "C:\Users\<current_user>\App Data\Roaming\hidn\hidn2.exe", respectively. By identifying and providing the correct mapping of the application data paths, the same artifact discovered by the IVP system in the behavior analysis is used to detect infection on multiple endpoint systems with different operating systems and software versions.

The functionality describe herein can be packaged and delivered to a security operation and incident teams, or to endpoint systems using one or more techniques including, but not limited to, self-extracting EXE file and an MSI agent with input files. Also, the same method and design is applicable to any computer operating system (OS) and brands, for example MAC with OSX. Such a system and related techniques are unique in providing infection verification and detection that provides for better verification and detection over other systems by:

1. leveraging global data collection so that catching one sample is sufficient for detecting its infection anywhere;

2. using behavior detonation and one or more persistent artifacts so that it detects with extremely low false positives; and 3. providing the ability to automated threat detection and response which is lacking in current solutions.

The embodiments overcome limitations of existing systems and methods which include:

Traditional endpoint system antivirus (AV) products analyze every malware-carrying file on a given endpoint system by applying signature and heuristics to the file on a given endpoint system;

In addition to suffering from signature evasion of the malware, the current techniques do not scale up to protecting large number of endpoint systems due to the complexity with keeping operating systems (OS) and signatures updated in a timely manner without causing stability issues at the endpoint systems;

Network based (Gateway) AV apply the same engine at a network gateway, suffering from the same evasion issue (thus false negatives), as well as false positive issues because it tries to quarantine files on the network based largely on signatures instead of behavior; and Forensic experts who investigate infection status of an endpoint system by manually looking for changes (so called indicator of compromise, IOC) left on the endpoint system by suspected malware. Such techniques are used for collecting forensic evidence after the damage has been done, and is labor intensive.

An IVP system according to an embodiment provides the benefit of helping confirm the infection of a given machine quickly so to prioritize the clean-up/recovery action for the infected machines first. For an embodiment, there are three ways of confirming an infection on our platform. First way includes seeing a command and control (CnC) activity, also called callbacks coming from the machine that downloaded malware earlier (as indicated by an incident flag DL+IN, according to an embodiment). By way of example, at time T the system detects the download (DL) of malware, such as a Zeus Trojan sample, by a host with an internet protocol (IP) address 10.1.1.10, the determined MD5 hash of the sample is eb6adf25a824ddf0f9b3bd8809aa1488. At time T+1 minute, a CnC event (IN) is triggered by the following rule, for example, the rule is in SNORT format for the benefit of explanation: alert tcp $HOME_NET any->$EXTERNAL_NET $HTTP_PORTS (msg:"CY AUTO TROJAN Generic eb6adf25a824ddf0f9b3bd8809aa1488 HTTP Callback 8916033"; flow:established,to_server; uricontent: "|2f|code|2e|php"; nocase; content:"POST"; nocase; http_method; content:"zeusean|2e|net"; nocase; http_header; content:"no|2d|cache"; nocase; http_header; classtype:trojan-activity; sid:8916033; rev:2;). In this example, the CnC event correlates with the download to confirm the infection of 10.1.1.10 by the Zeus download.

Second way includes using another deployed endpoint system visibility and control solution (endpoint solution), e.g. CarbonBlack, which is configured to interact with the behavior analysis of an IVP system. For such an IVP system, a query can be sent to the endpoint solution to determine if an object with an MD5 hash of eb6adf25a824ddf0f9b3bd8809aa1488 executes on the computer with IP address 10.1.1.10. An example of the information contained in such a query includes, as represented here for illustration purposes as an equivalent English sentence, did an object with MD5=eb6adf25a824ddf0f9b3bd8809aa1488 execute on the computer with IP address 10.1.1.10? One skilled in the art would understand the information contained in such a query would be formatted into a syntax for communicating query information to an endpoint system. For such a scenario, when the endpoint solution reports that the object executed on the machine, a confirmation of the malware execution is obtained (as indicated by DL+EX flag according to an embodiment, where EX means executed). A third way includes running an IVP tool and getting a result of "CONFIRMED." For an embodiment, using the three ways above, the system has a very good coverage in infection verification.

An IVP system, according to an embodiment, picks as an IVP input those items that do not overlap with normal system files/changes to avoid false positives. For example, process spoofing, or malware generating process information to look like legitimate software application, is a unique artifact for infection verification. Benign applications have very little use for spoofing a process, but malware does it in order to evade detection. Some malware is configured to spoof itself as a notepad application which is a simple plain file editor on Windows® systems. Examples of an IVP input that does not overlap with normal system files includes, but is not limited to, registry changes, file system changes, suspicious process(es) spawned, and new service(s) created. However, if it's UNCONFIRMED, it does not mean that the host is not infected. A system may be configured to perform other steps to investigate or otherwise provide information for performing manual steps to investigate if they have a very high security posture. For example, a system may be configured to conduct a complete system scan of all files using a different malware detection tool.

For an embodiment, the IVP system includes an IVP tool which may be implemented using an executable and an input file that instructs the executable on how to remove some persistent artifacts from an infected system, thus cleaning the malware infection off of the computer. This is achieved by selecting those malware and the infected target systems, where the clean-up actions can be taken, e.g., terminating certain processes, removing certain registry entries, and/or deleting certain files from the persistent storage on infected system.

For an embodiment, an IVP system includes an IVP tool which may be implemented using an executable and an input file that instructs the executable on what to verify. The input file includes a header at the beginning, and then a verification type and the verification data on each line afterwards. An example of information contained in an input file includes:

network_object_id: "123456"
event_id: "123456"
sha1sum: "372cad1690320b3ad6988cce15a18696350f50b9"
central_manager_ip: "10.0.3.147"
client_ip: "192.168.2.45"
ivp_version: "3.0"
sandbox_platform: "winxp"
new_file: "C:\trivax1.Bin\trivax1.Bin.exe"
file_overwrite: "C:\WINDOWS\system32\wuautui.dll"
spoofed_process: "C:\WINDOWS\inf\win\notepad.exe"
new_regkey: "\REGISTRY\MACHINE\SOFTWARE\Microsoft\Windows\CurrentVersion\AppPaths\svc_agent.exe"

new_regval: "\REGISTRY\USER\S-1-5-21-842925246-484763869-117609710-500\Software\Microsoft\Windows\CurrentVersion\Run" "CI_TMP_BSCkKg.exe" "C:\Documents and Settings\Administrator\My Documents\Downloads\CI_TMP_BSCkKg.exe"

new_service: "MSUNatService"

Below is an exemplary list of verification types supported by an embodiment of an IVP system:

---
new_file
file_overwrite
new_regkey
new_regval
new_service
spoofed_process

---

For an embodiment, the input file is an input text file (with an extension of ".ivp") and will be downloaded from a Central Manager—such as a security server, which can be the same server that generates IVP data or not—and will be forwarded to the infected machine. The infected machine downloads an input file automatically or based on input from a user. Such input may include, but is not limited to, a double click on a file having an .ivp extension and other user input including those known in the art. The IVP tool will automatically launch and process that input file and then display the results based on the analysis. For another embodiment, an IVP tool may be packaged as an MSI installer. For an embodiment, an IT administrator may push and pre-install an IVP tool on the client machines within their domain.

At the end of the run, an IVP tool will make an HTTP POST to the Central Manager to upload an output file. For an embodiment, an uploaded output format is different from the format displayed locally to a user. The name for this file will be known to the Central Manager, for an example the file will be "ivp-result.txt".

The output file, according to an embodiment, includes a header at the beginning and the result for each verification action on subsequent lines:

---
infected,<true | false>
network_object_id,123456
event_id,123456
   sha1sum,372cad1690320b3ad6988cce15a18696350f50b9
   client_ip,192.168.2.45
   local_ip,192.168.2.45
   timestamp,<epoch_time>
   confirmed,new_file,"C:\temp\ \x28NUL\x29.lnk"
   confirmed,new_file,"C:\temp\ \u00b5_Edit2.txt"
   confirmed,new_file,"C:\temp\cytrace.exe"
   signed_file,new_file,"C:\windows\notepad.exe"
   whitelisted,new_file,"C:\windOws\mylog.log"
   unconfirmed,file_overwrite,"C:\windows\notEpad.exe"
   whitelisted,new_file,"C:\Windows\ \u00c2blah.log"
   confirmed,new_regval,"\REGISTRY\MACHINE\SOFTWARE\Microsoft\Windows NT\CurrentVersion\Winlogon" "Userinit" "C:\WINDOWS\system32\userinit.exe,C:\Documents and Settings\Administrator\Application Data\09A52917-B4FC-4f02-AE3B-BF55D9351F4A\msvcs.exe"
   unconfirmed,new_regval,"\REGISTRY\MACHINE\SOFTWARE\Microsoft\Windows\CurrentVersion\Run" "2C508BD5-F9C6-4955-B93A-09B835EC3C64" "QUERY KEY FAILED"

---

For the results, anything other than "confirmed" will be interpreted as "unconfirmed"—"whitelisted" and "signed_file" are just different variations of "unconfirmed".

The output log file will be uploaded to the Central Manager. Thus, according to an embodiment, the IVP system can make a couple of presumptions including, but not limited to:

The IP address of the Central Manager is known (from the input file);

The device_key of the device that generates the ivp-input file;

The universally unique identifier (UUID) of the device that generates the ivp-input file; and Any other information that could be used for handshaking with the Central Manager.

For an embedment, the IVP system includes a listener on the Central Manager side to handle this specific HTTP POST request to upload the IVP log file. A listener includes, but is not limited to, a functional module that keeps track of the list of all IVP actions and their status, e.g. dispatched or not as part of an incident response workflow, the verification log was received or not, and was the infection confirmed or not.

For an embodiment, the IVP system may be configured to use verification strings, e.g., "C:\temp\\x28NUL\x29.lnk" and "C:\temp\\u00b5_Edit2.txt," in the IVP-input file that, according to an embodiment, are encoded in a hybrid UTF8 encoding process, so they need to be decoded into corresponding wide strings before the verification. In the above two verification strings, hexadecimal encoding was used for a special value such as \x28 and \x29, and another special character is represented using \u00b5, while the rest of the printable characters were encoded in UTF8. The key is that, for verification comparison on any endpoint systems, the verification strings from IVP input and the strings retrieved from the endpoint system are unified into the same wide string encoding (2-byte code) before being compared. However, one skilled in the art would understand that other types of encoding may be used. File paths are intentionally varied in the "character case" by the malwares, so it's necessary to do case insensitive matching.

File paths are varied from system to system (even on the same OS version if using different user names), so the IVP system is configured to parse the information by, for example, dissecting/substituting appropriate environment strings on the current system before verifying. For example:
new_file: "C:\Documents and Settings\Administrator\Application Data\hidn\hidn2.exe"

If run on a Windows® 7 machine, it should be transformed to something like:
new_file: "C:\Users\<current_user>\AppData\Roaming\hidn\hidn2.exe.

Registry data can also contain embedded file paths, so an IVP system may be configured to recognize when the data contains something like a file path (as opposed to a hex value or a binary data) and perform proper transformation to that data string before comparing. If the malware replaces a system file, the IVP system is configured to check a digital signature of that file. A digital signature may be formed using for example, md5sum, sha1, or other hashing algorithms including those known in the art. For an embodiment, some non-binary files or registries that are generic and exist on all systems may be whitelisted by the IVP system such that the system will not check for them.

Figure 1:
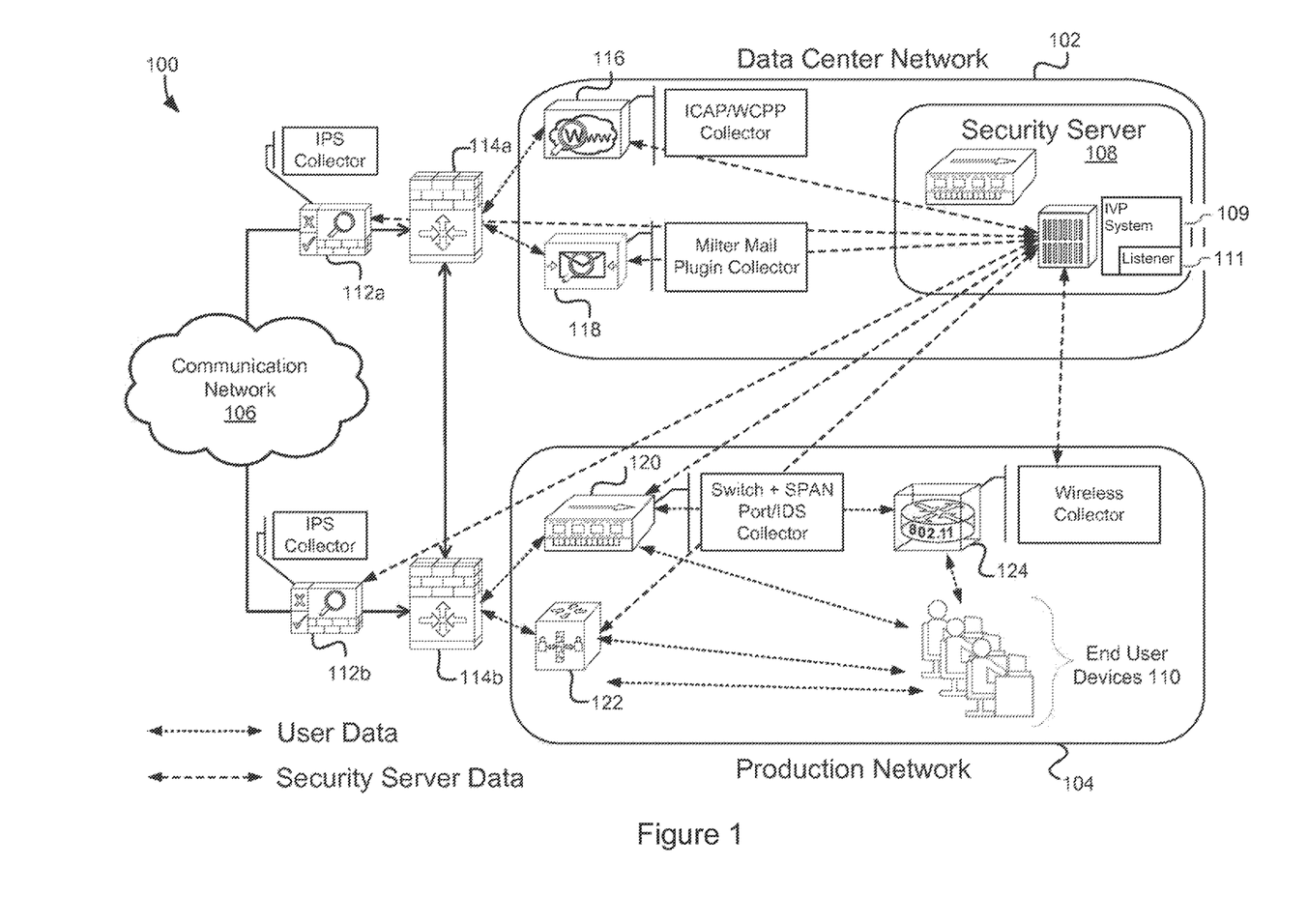
FIG. 1 illustrates a block diagram of a network environment that includes an infection verification pack system configured to detect malware according to an embodiment.
Figure 3:
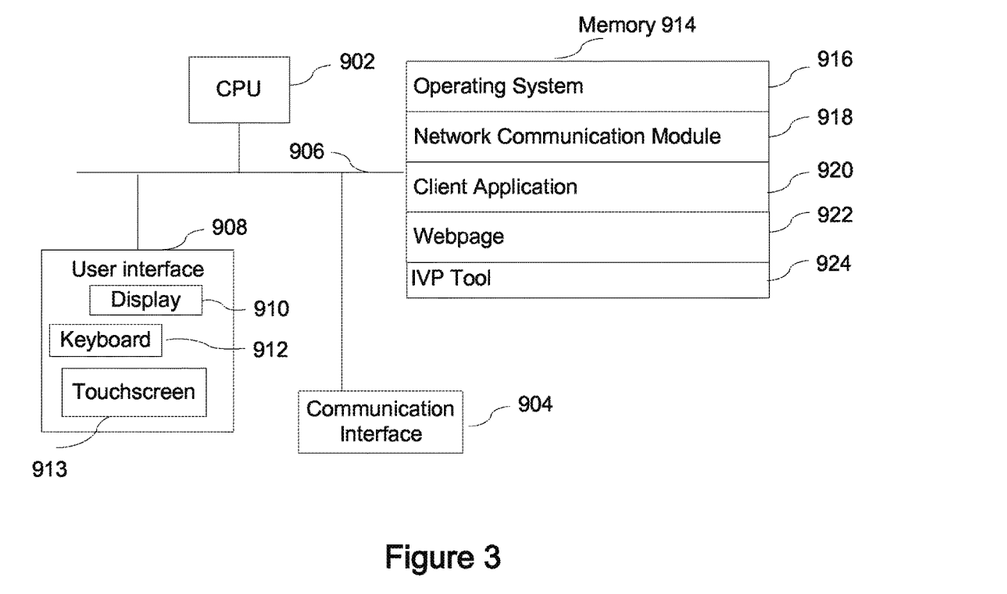
FIG. 3 illustrates an embodiment of a client according to an embodiment.

FIG. 1 illustrates a block diagram of a network environment 100 that includes an IVP system according to an embodiment. Systems and methods embodied in the network environment 100 may implement one or more of including, but not limited to, behavior detonation; apply machine-learning based classification models to identify a malware object; apply one or more algorithms to behavior traces of the malware object to select one or more persistent artifacts from the infection of this malware on the target system; transform the one or more persistent artifacts into a form that can be used to verify and detect infection by this malware of a number of endpoint systems with different operating systems and software versions; and incorporate into a program one or more algorithms, which when run on any endpoint system along with the transformed artifacts (IVP input), will produce a "confirmed" or "unconfirmed" output. The network environment 100 comprises a data center network 102 and a production network 104 that communicate over a communication network 106. The data center network 102 includes a Central Manager for the IVP system 109, such as a security server 108. The production network 104 comprises a plurality of end user devices 110 (also referred to herein as an endpoint system). The security server 108 and the end user devices 110 may comprise digital devices. A digital device is any device with a processor and memory. An embodiment of a digital device is depicted in FIG. 3.

The security server 108 is a digital device configured to identify malware and/or suspicious behavior by running virtualized and emulated environments and monitoring behavior of suspicious data within the virtualized and emulated environments. The security server 108 is also configured to implement one or more aspects of the IVP system 109 and a listener 111 including those described herein. In various embodiments, the security server 108 receives suspicious data from one or more data collectors. The data collectors may be resident within or in communication with network devices such as Intrusion Prevention System (IPS) collectors 112a and 112b, firewalls 114a and 114b, ICAP/WCCP collectors 116, milter mail plug-in collectors 118, switch collectors 120, and/or access points 124. Those skilled in the art will appreciate that a collector and a network device may be two separate digital devices (e.g., see F/W collector and IDS collector).

In various embodiments, data collectors may be at one or more points within the communication network 106. A data collector, which may include a tap or span port (e.g., span port IDS collector at switch 120) for example, is configured to intercept network data from a network. The data collector may be configured to identify suspicious data. Suspicious data is any data collected by the data collector that has been flagged as suspicious by the data collector and/or any data that is to be processed within the virtualization environment.

The data collectors may filter the data before flagging the data as suspicious and/or providing the collected data to the security server 108. For example, the data collectors may filter out plain text but collect executables or batch files. Further, in various embodiments, the data collectors may perform intelligent collecting. For example, data may be hashed and compared to a whitelist. The whitelist may identify data that is safe. In one example, the whitelist may identify digitally signed data or data received from a known trusted source as safe. Further, the whitelist may identify previously received information that has been determined to be safe. If data has been previously received, tested within the environments, and determined to be sufficiently trustworthy, the data collector may allow the data to continue through the network. Those skilled in the art will appreciate that the data collectors (or agents associated with the data collectors) may be updated by the security server 108 to help the data collectors recognize sufficiently trustworthy data and to take corrective action (e.g., quarantine and alert an administrator) if untrustworthy data is recognized. In some embodiments, if data is not identified as safe, the data collectors may flag the data as suspicious for further assessment.

Those skilled in the art will appreciate that one or more agents or other modules may monitor network traffic for common behaviors and may configure a data collector to collect data when data is directed in a manner that falls outside normal parameters. For example, the agent may determine or be configured to appreciate that a computer has been deactivated, a particular computer does not typically receive any data, or data received by a particular computer typically comes from a limited number of sources. If data is directed to a digital device in a manner that is not typical, the data collector may flag such data as suspicious and provide the suspicious data to the security server 108.

Network devices include any device configured to receive and provide data over a network. Examples of network devices include, but are not limited to, routers, bridges, security appliances, firewalls, web servers, mail servers, wireless access points (e.g., hotspots), and switches. In some embodiments, network devices include IPS collectors 112a and 112b, firewalls 114a and 114b, Internet content adaptation protocol (ICAP)/web cache communication protocol (WCCP) servers 116, devices including milter mail plug-ins 118, switches 120, and/or access points 124. The IPS collectors 112a and 112b may include any anti-malware device including IPS systems, intrusion detection and prevention systems (IDPS), or any other kind of network security appliances. The firewalls 114a and 114b may include software and/or hardware firewalls. In some embodiments, the firewalls 114a and 114b may be embodied within routers, access points, servers (e.g., web servers), or appliances.

ICAP/WCCP servers 116 include any web server or web proxy server configured to allow access to a network and/or the Internet. Network devices including milter mail plug-ins 118 may include any mail server or device that provides mail and/or filtering functions and may include digital devices that implement milter, mail transfer agents (MTAs), sendmail, and postfix, for example. Switches 120 include any switch or router. In some examples, the data collector may be implemented as a TAP, SPAN port, and/or intrusion detection system (IDS). Access points 124 include any device configured to provide wireless connectivity with one or more other digital devices.

The production network 104 is any network that allows one or more end user devices 110 to communicate over the communication network 106. The communication network 106 is any network that may carry data (encoded, compressed, and/or otherwise) from one digital device to another. In some examples, the communication network 106 may comprise a LAN and/or WAN. Further, the communication network 106 may comprise any number of networks. In some embodiments, the communication network 106 is the Internet.

FIG. 1 is exemplary and does not limit systems and methods described herein to the use of only those technologies depicted. For example, data collectors may be implemented in any web or web proxy server and is not limited to only the servers that implement ICAP and/or WCCP. Similarly, collectors may be implemented in any mail server and is not limited to mail servers that implement milter. Data collectors may be implemented at any point in one or more networks.

Those skilled in the art will appreciate that although FIG. 1 depicts a limited number of digital devices, collectors, routers, access points, and firewalls, there may be any kind and number of devices. For example, there may be any number of security servers 108, end user devices 110, IPS collectors 112a and 112b, firewalls 114a and 114b, ICAP/WCCP collectors 116, milter mail plug-ins 118, switches 120, and/or access points 124. Further, there may be any number of data center networks 102 and/or production networks 104.

Figure 2:
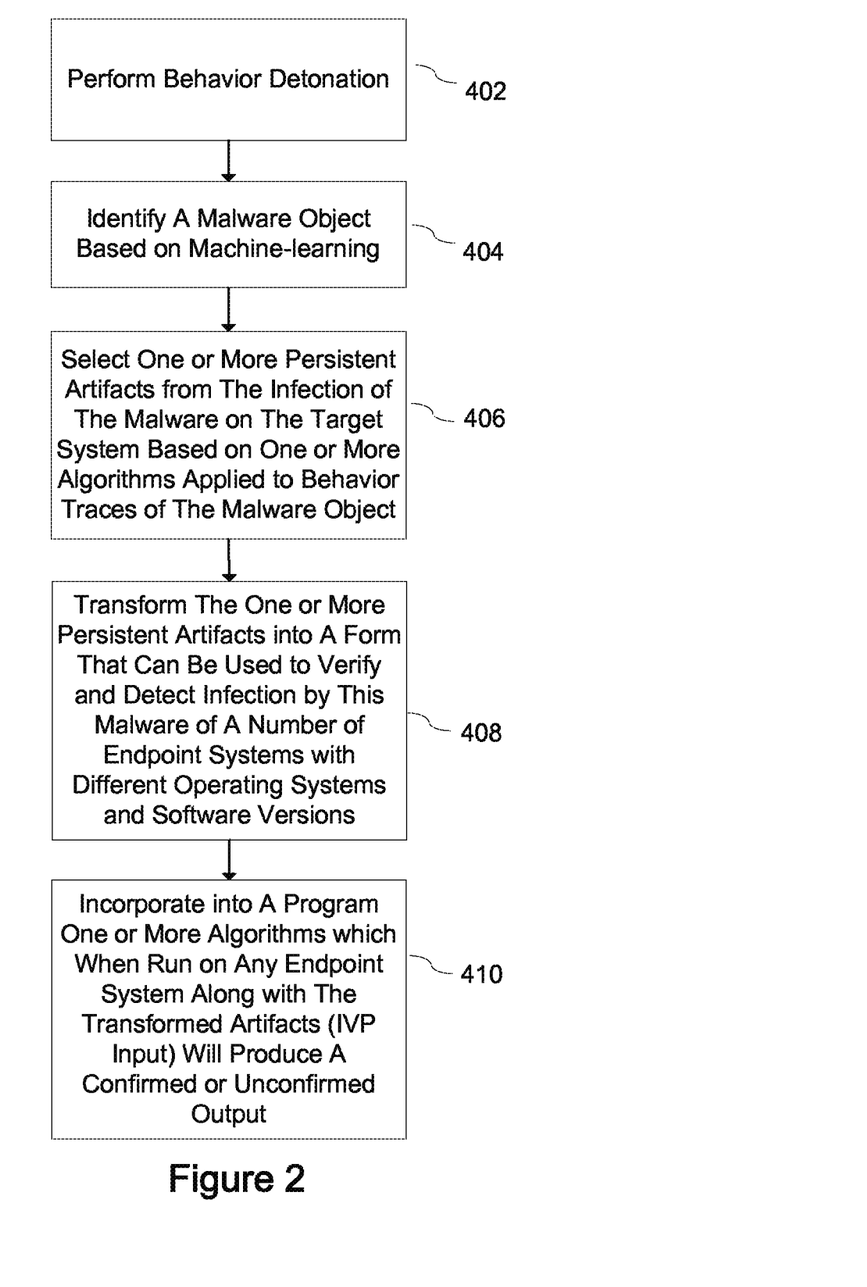
FIG. 2 illustrates a flow diagram of a method to perform infection verification according to an embodiment.

FIG. 2 illustrates a flow diagram of a method to perform infection verification according to an embodiment. Such a method may be implemented on a network environment including those described herein. The method includes performing behavior detonation (402). The method also includes applying machine-learning based classification models to identify a malware object (404). For example, classification model includes, but is not limited to, a model built for Windows® executable file type which is applied to determine if any given Windows® executable file is malicious, another model is built for a Portable Document Format (PDF) file type which is applied to determine if a given PDF file has malicious content embedded in it, and other models to detect malicious content in file types. To generate a classification model, when a file object is received, it goes through behavior detonation, traces get collected and a set of feature values are extracted. These feature value set is then sent to the appropriate machine-learning model determined by the file type and the model produces a detection verdict. The method applies one or more algorithms to behavior traces of the malware object to select one or more persistent artifacts from the infection of this malware on the target system (406). For example, one algorithm may select more artifacts on registry changes to favor confirming more infection by this malware on multiple Windows OSes (e.g. Windows XP, Windows 7 etc). Another exemplary algorithm may select more changes to file systems or running processes, with an objective of confirming infection by certain category of malware (e.g. banking Trojan vs. adware) on a specific Windows® OS. In addition, the method transforms the one or more persistent artifacts into a form that can be used to verify and detect infection by this malware of a number of endpoint systems with different operating systems and software versions (408). The method also incorporates into a program one or more algorithms, which when run on any endpoint system along with the transformed artifacts (IVP input), will produce a "confirmed" or "unconfirmed" output (410).

FIG. 3 illustrates an embodiment of a client, user device, client machine, or digital device that includes one or more processing units (CPUs) 902, one or more network or other communications interfaces 904, memory 914, and one or more communication buses 906 for interconnecting these components. The client may include a user interface 908 comprising a display device 910, a keyboard 912, a touchscreen 913 and/or other input/output device. Memory 914 may include high speed random access memory and may also include non-volatile memory, such as one or more magnetic or optical storage disks. The memory 914 may include mass storage that is remotely located from CPUs 902. Moreover, memory 914, or alternatively one or more storage devices (e.g., one or more nonvolatile storage devices) within memory 914, includes a computer readable storage medium. The memory 914 may store the following elements, or a subset or superset of such elements:

- an operating system 916 that includes procedures for handling various basic system services and for performing hardware dependent tasks;
- a network communication module 918 (or instructions) that is used for connecting the client to other computers, clients, servers, systems or devices via the one or more communications network interfaces 904 and one or more communications networks, such as the Internet, other wide area networks, local area networks, metropolitan area networks, and other type of networks; and
- a client application 920 including, but not limited to, a web browser, a document viewer or other application for viewing information;
- a webpage 922 including one generated by the client application 920 configured to receive a user input to communicate with across a network with other computers or devices; and
- an IVP tool 924 to perform one or more aspects of an IVP system as described herein.

According to an embodiment, the client may be any device that includes, but is not limited to, a mobile phone, a computer, a tablet computer, a personal digital assistant (PDA) or other mobile device.

Figure 4:
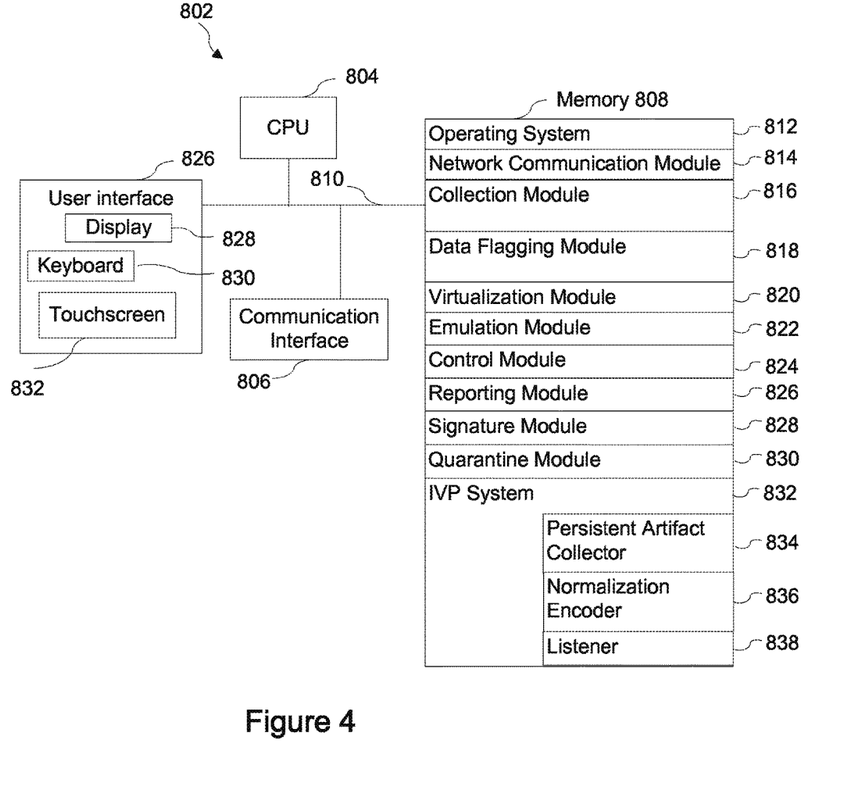
FIG. 4 illustrates an embodiment of a system for detecting malware according to an embodiment.

FIG. 4 illustrates an embodiment of a server, such as a system that implements the methods described herein. The system, according to an embodiment, includes one or more processing units (CPUs) 804, one or more communication interface 806, memory 808, and one or more communication buses 810 for interconnecting these components. The system 802 may optionally include a user interface 826 comprising a display device 828, a keyboard 830, a touchscreen 832, and/or other input/output devices. Memory 808 may include high speed random access memory and may also include non-volatile memory, such as one or more magnetic or optical storage disks. The memory 808 may include mass storage that is remotely located from CPUs 804. Moreover, memory 808, or alternatively one or more storage devices (e.g., one or more nonvolatile storage devices) within memory 808, includes a computer readable storage medium. The memory 808 may store the following elements, or a subset or superset of such elements: an operating system 812, a network communication module 814, a collection module 816, a data flagging module 818, a virtualization module 820, an emulation module 822, a control module 824, a reporting module 826, a signature module 828, a quarantine module 830, a IVP System 832, a persistent artifact collector 834, a normalization encoder 836, and a listener 838. An operating system 812 that includes procedures for handling various basic system services and for performing hardware dependent tasks. A network communication module 814 (or instructions) that is used for connecting the system to other computers, clients, peers, systems or devices via the one or more communication network interfaces 806 and one or more communication networks, such as the Internet, other wide area networks, local area networks, metropolitan area networks, and other type of networks.

A collection module 816 (or instructions) for inspecting objects for potentially malware-carrying objects. Further, the collection module 816 is configured to receive network data (e.g., potentially suspicious data) from one or more sources. Network data is data that is provided on a network from one digital device to another. The collection module 816 may flag the network data as suspicious data based on, for example, whitelists blacklists, heuristic analysis, statistical analysis, rules, and/or atypical behavior. In some embodiments, the sources comprise data collectors configured to receive network data. For example, firewalls, IPS, servers, routers, switches, access points and the like may, either individually or collectively, function as or include a data collector. The data collector may forward network data to the collection module 816.

In some embodiments, the data collectors filter the data before providing the data to the collection module 816. For example, the data collector may be configured to collect or intercept data that includes executables and batch files. In some embodiments, the data collector may be configured to follow configured rules. For example, if data is directed between two known and trustworthy sources (e.g., the data is communicated between two device on a whitelist), the data collector may not collect the data. In various embodiments, a rule may be configured to intercept a class of data (e.g., all MS Word® documents that may include macros or data that may comprise a script). In some embodiments, rules may be configured to target a class of attack or payload based on the type of malware attacks on the target network in the past. In some embodiments, the system may make recommendations (e.g., via the reporting module 826) and/or configure rules for the collection module 816 and/or the data collectors. Those skilled in the art will appreciate that the data collectors may comprise any number of rules regarding when data is collected or what data is collected.

In some embodiments, the data collectors located at various positions in the network may not perform any assessment or determination regarding whether the collected data is suspicious or trustworthy. For example, the data collector may collect all or a portion of the network data and provide the collected network data to the collection module 816 which may perform filtering.

A data flagging module 818 (or instructions) may perform one or more assessments to the collected data received by the collection module 816 and/or the data collector to determine if the intercepted network data is suspicious. The data flagging module 818 may apply rules using techniques including those known in the art to determine if the collected data should be flagged as suspicious. In various embodiments, the data flagging module 818 may hash the data and/or compare the data to a whitelist to identify the data as acceptable. If the data is not associated with the whitelist, the data flagging module 818 may flag the data as suspicious.

In various embodiments, collected network data may be initially identified as suspicious until determined otherwise (e.g., associated with a whitelist) or heuristics find no reason that the network data should be flagged as suspicious. In some embodiments, the data flagging module 818 may perform packet analysis to look for suspicious characteristics in the header, footer, destination IP, origin IP, payload, and the like. Those skilled in the art will appreciate that the data flagging module 818 may perform a heuristic analysis, a statistical analysis, and/or signature identification (e.g., signature-based detection involves searching for known patterns of suspicious data within the collected data's code) to determine if the collected network data is suspicious.

The data flagging module 818 may be resident at the data collector, at the system, partially at the data collector, partially at a security server 108, or on a network device. For example, a router may comprise a data collector and a data flagging module 818 configured to perform one or more heuristic assessments on the collected network data. If the collected network data is determined to be suspicious, the router may direct the collected data to the security server 108.

In various embodiments, the data flagging module 818 may be updated. In one example, the security server 108 may provide new entries for a whitelist, entries for a blacklist, heuristic algorithms, statistical algorithms, updated rules, and/or new signatures to assist the data flagging module 818 to determine if network data is suspicious. The whitelists, entries for whitelists, blacklists, entries for blacklists, heuristic algorithms, statistical algorithms, and/or new signatures may be generated by one or more security servers 108 (e.g., via the reporting module 826).

The virtualization module 820 and emulation module 822 may analyze suspicious data for untrusted behavior (e.g., malware, distributed attacks, detonation). The virtualization module 820 is configured to instantiate one or more virtualized environments to process and monitor suspicious data. Within the virtualization environment, the suspicious data may operate as if within a target digital device. The virtualization module 820 may monitor the operations of the suspicious data within the virtualization environment to determine that the suspicious data is probably trustworthy, malware, or requiring further action (e.g., further monitoring in one or more other virtualization environments and/or monitoring within one or more emulation environments). In various embodiments, the virtualization module 820 monitors modifications to a system, checks outbound calls, and checks tainted data interactions.

In some embodiments, the virtualization module 820 may determine that suspicious data is malware but continue to process the suspicious data to generate a full picture of the malware, identify the vector of attack, determine the type, extent, and scope of the malware's payload, determine the target of the attack, and detect if the malware is to work with any other malware. In this way, the security server 108 may extend predictive analysis to actual applications for complete validation. A report may be generated (e.g., by the reporting module 826) describing the malware, identify vulnerabilities, generate or update signatures for the malware, generate or update heuristics or statistics for malware detection, and/or generate a report identifying the targeted information (e.g., credit card numbers, passwords, or personal information).

In some embodiments, the virtualization module 820 may flag suspicious data as requiring further emulation and analytics in the back end if the data has suspicious behavior such as, but not limited to, preparing an executable that is not executed, performing functions without result, processing that suddenly terminates, loading data into memory that is not accessed or otherwise executed, scanning ports, or checking in specific portions of memory when those locations in memory may be empty. The virtualization module 820 may monitor the operations performed by or for the suspicious data and perform a variety of checks to determine if the suspicious data is behaving in a suspicious manner.

The emulation module 822 is configured to process suspicious data in an emulated environment. Those skilled in the art will appreciate that malware may require resources that are not available or may detect a virtualized environment. When malware requires unavailable resources, the malware may "go benign" or act in a non-harmful manner. In another example, malware may detect a virtualized environment by scanning for specific files and/or memory necessary for hypervisor, kernel, or other virtualization data to execute. If malware scans portions of its environment and determines that a virtualization environment may be running, the malware may "go benign" and either terminate or perform nonthreatening functions.

In some embodiments, the emulation module 822 processes data flagged as behaving suspiciously by the virtualization environment. The emulation module 822 may process the suspicious data in a bare metal environment where the suspicious data may have direct memory access. The behavior of the suspicious data as well as the behavior of the emulation environment may be monitored and/or logged to track the suspicious data's operations. For example, the emulation module 822 may track what resources (e.g., applications and/or operating system files) are called in processing the suspicious data.

In various embodiments, the emulation module 822 records responses to the suspicious data in the emulation environment. If a divergence in the operations of the suspicious data between the virtualization environment and the emulation environment is detected, the virtualization environment may be configured to inject the response from the emulation environment. The suspicious data may receive the expected response within the virtualization environment and continue to operate as if the suspicious data was within the targeted digital device.

A control module 824 (or instructions) control module 824 synchronizes the virtualization module 820 and the emulation module 822. In some embodiments, the control module 824 synchronizes the virtualization and emulation environments. For example, the control module 824 may direct the virtualization module 820 to instantiate a plurality of different virtualization environments with different resources. The control module 824 may compare the operations of different virtualization environments to each other in order to track points of divergence. For example, the control module 824 may identify suspicious data as operating in one manner when the virtualization environment includes, but is not limited to, Internet Explorer v. 7.0 or v. 8.0, but operating in a different manner when interacting with Internet Explorer v. 6.0 (e.g., when the suspicious data exploits a vulnerability that may be present in one version of an application but not present in another version).

The control module 824 may track operations in one or more virtualization environments and one or more emulation environments. For example, the control module 824 may identify when the suspicious data behaves differently in a virtualization environment in comparison with an emulation environment. Divergence and correlation analysis is when operations performed by or for suspicious data in a virtual environment is compared to operations performed by or for suspicious data in a different virtual environment or emulation environment. For example, the control module 824 may compare monitored steps of suspicious data in a virtual environment to monitored steps of the same suspicious data in an emulation environment. The functions or steps of or for the suspicious data may be similar but suddenly diverge. In one example, the suspicious data may have not detected evidence of a virtual environment in the emulation environment and, unlike the virtualized environment where the suspicious data went benign, the suspicious data undertakes actions characteristic of malware (e.g., hijacks a formerly trusted data or processes).

When divergence is detected, the control module 824 may re-provision or instantiate a virtualization environment with information from the emulation environment (e.g., a page table including state information and/or response information further described herein) that may not be previously present in the originally instantiation of the virtualization environment. The suspicious data may then be monitored in the new virtualization environment to further detect suspicious behavior or untrusted behavior. Those skilled in the art will appreciate that suspicious behavior of an object is behavior that may be untrusted or malicious. Untrusted behavior is behavior that indicates a significant threat.

In some embodiments, the control module 824 is configured to compare the operations of each virtualized environment in order to identify suspicious or untrusted behavior. For example, if the suspicious data takes different operations depending on the version of a browser or other specific resource when compared to other virtualized environments, the control module 824 may identify the suspicious data as malware. Once the control module 824 identifies the suspicious data as malware or otherwise untrusted, the control module 824 may continue to monitor the virtualized environment to determine the vector of attack of the malware, the payload of the malware, and the target (e.g., control of the digital device, password access, credit card information access, and/or ability to install a bot, keylogger, and/or rootkit). For example, the operations performed by and/or for the suspicious data may be monitored in order to further identify the malware, determine untrusted acts, and log the effect or probable effect.

A reporting module 826 (or instructions) is configured to generate a data model based on a generated list of events. Further a reporting module 826 is configured to generate reports based on the processing of the suspicious data of the virtualization module 820 and/or the emulation module 822. In various embodiments, the reporting module 826 generates a report to identify malware, one or more vectors of attack, one or more payloads, target of valuable data, vulnerabilities, command and control protocols, and/or behaviors that are characteristics of the malware. The reporting module 826 may also make recommendations to safeguard information based on the attack (e.g., move credit card information to a different digital device, require additional security such as VPN access only, or the like).

In some embodiments, the reporting module 826 generates malware information that may be used to identify malware or suspicious behavior. For example, the reporting module 826 may generate malware information based on the monitored information of the virtualization environment. The malware information may include a hash of the suspicious data or a characteristic of the operations of or for the suspicious data. In one example, the malware information may identify a class of suspicious behavior as being one or more steps being performed by or for suspicious data at specific times. As a result, suspicious data and/or malware may be identified based on the malware information without virtualizing or emulating an entire attack.

A signature module 828 (or instructions) is configured to classify said chain of a plurality of hypertext transfer objects based on said list of events. Further a signature module 828 is configured to store signature files that may be used to identify malware. The signature files may be generated by the reporting module 312 and/or the signature module 828. In various embodiments, the security server 108 may generate signatures, malware information, whitelist entries, and/or blacklist entries to share with other security servers. As a result, the signature module 828 may include signatures generated by other security servers or other digital devices. Those skilled in the art will appreciate that the signature module 828 may include signatures generated from a variety of different sources including, but not limited to, other security firms, antivirus companies, and/or other third-parties.

In various embodiments, the signature module 828 may provide signatures which are used to determine if network data is suspicious or is malware. For example, if network data matches the signature of known malware, then the network data may be classified as malware. If network data matches a signature that is suspicious, then the network data may be flagged as suspicious data. The malware and/or the suspicious data may be processed within a virtualization environment and/or the emulation environment as discussed herein.

A quarantine module 830 (or instructions) is configured to quarantine suspicious data and/or network data. In various embodiments, when the security serer 108 identifies malware or probable malware, the quarantine module 830 may quarantine the suspicious data, network data, and/or any data associated with the suspicious data and/or network data. For example, the quarantine module 830 may quarantine all data from a particular digital device that has been identified as being infected or possibly infected. In some embodiments, the quarantine module 830 is configured to alert a security administrator or the like (e.g., via email, call, voicemail, or SMS text message) when malware or possible malware has been found.

An IVP system 832 which includes, but is not limited to, a persistent artifact collector 834 configured to detect and/or collect artifact information of malware, a normalization encoder 836 configured to transform and/or filter out artifacts that would not be a good indicator of malware, and a listener 838, as described herein. The IVP system also includes one or more IVP tools deployed to a client machine in a network environment as described herein. The IVP system 834 for applying one or more algorithms to behavior traces of the malware object to select one or more persistent artifacts from the infection of this malware on the target system; transforming the one or more persistent artifacts into a form that can be used to verify and detect infection by this malware of a number of endpoint systems with different operating systems and software versions; and incorporating into a program one or more algorithms which when run on any endpoint system along with the transformed artifacts (IVP input), will produce a "confirmed" or "unconfirmed" output using techniques including those described herein.

Although FIG. 4 illustrates system 802 as a computer it could be distributed system, such as a server system. The figures are intended more as functional descriptions of the various features which may be present in a client and a set of servers than as a structural schematic of the embodiments described herein. As such, one of ordinary skill in the art would understand that items shown separately could be combined and some items could be separated. For example, some items illustrated as separate modules in FIG. 4 could be implemented on a single server or client and single items could be implemented by one or more servers or clients. The actual number of servers, clients, or modules used to implement a system 802 and how features are allocated among them will vary from one implementation to another, and may depend in part on the amount of data traffic that the system must handle during peak usage periods as well as during average usage periods. In addition, some modules or functions of modules illustrated in FIG. 4 may be implemented on one or more one or more systems remotely located from other systems that implement other modules or functions of modules illustrated in FIG. 4.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A device comprising:
a memory; and
one or more processors to:
perform behavior detonation through an execution of a file object in one or more virtual environments;
extract feature values from one or more behavior traces generated from performing the behavior detonation;
send the feature values to a machine learning model;
identify the file object as a first malware object based on sending the feature values to the machine learning model;
select one or more persistent artifacts, generated in the one or more virtual environments as a result of the execution of the file object in the one or more virtual environments, based on one or more algorithms applied to behavior traces of the file object,
the one or more persistent artifacts including one or more of:
information identifying a creation of a file, or
information identifying an addition of a registry key;
transform the one or more persistent artifacts into a form to detect a second malware object in another device using a different operating system,
the one or more persistent artifacts, before being transformed, having a first mapping of an application data path, and
the one or more transformed persistent artifacts having a second mapping of the application data path,
the second mapping corresponding to the different operating system; and
incorporate the one or more transformed persistent artifacts into a set of instructions to be executed on the other device using the different operating system.

2. The device of claim 1, wherein the one or more processors are further to:
incorporate, into a program, one or more algorithms, which when run on any endpoint system along with the one or more transformed persistent artifacts, produce a confirmed or an unconfirmed output.

3. The device of claim 1, wherein the one or more processors, when transforming the one or more persistent artifacts into the form, are to:
transform the one or more persistent artifacts into one or more specification lines.

4. The device of claim 1, wherein the one or more processors, when transforming the one or more persistent artifacts into the form, are to:
transform the one or more persistent artifacts into at least one new file.

5. The device of claim 1, where the machine learning model is a first machine learning model and the file object is a first type of file; and
where the one or more processors are further to:
identify a second file object as a malicious object based on sending feature values, associated with the second file object, to a second machine learning model,
the second file object being a second type of file.

6. The device of claim 1, wherein the one or more processors are further to:
perform a corrective action based on detecting the second malware object.

7. A non-transitory computer-readable medium storing instructions, the instructions comprising:
one or more instructions that, when executed by at least one processor, cause the at least one processor to:
perform behavior detonation through an execution of a file object in one or more virtual environments;
extract feature values from one or more behavior traces generated from performing the behavior detonation;
send the feature values to a machine learning model;
identify the file object as a first malware object based on sending the feature values to the machine learning model;

select one or more persistent artifacts, generated in the one or more virtual environments as a result of the execution of the file object in the one or more virtual environments, based on one or more algorithms applied to behavior traces of the file object,
the one or more persistent artifacts including one or more of:
information identifying a creation of a file, or
information identifying an addition of a registry key;
transform the one or more persistent artifacts into a form to detect a second malware object in another device using a different operating system,
the one or more persistent artifacts, before being transformed, having a first mapping of an application data path, and
the one or more transformed persistent artifacts having a second mapping of the application data path,
the second mapping corresponding to the different operating system; and
incorporate the one or more transformed persistent artifacts into a set of instructions to be executed on the other device using the different operating system.

8. The non-transitory computer-readable medium of claim 7, wherein the one or more instructions, when executed by the at least one processor, further cause the at least one processor to:
confirm an infection of an endpoint system based on incorporating the one or more transformed persistent artifacts.

9. The non-transitory computer-readable medium of claim 7, wherein the one or more instructions, when executed by the at least one processor, further cause the at least one processor to:
confirm an infection of an endpoint system based on incorporating the one or more transformed persistent artifacts and based on a response to a query to an endpoint solution.

10. The non-transitory computer-readable medium of claim 7, wherein the one or more instructions, when executed by the at least one processor, further cause the at least one processor to:
confirm an infection of an endpoint system based on incorporating the one or more transformed persistent artifacts and based on command and control activity.

11. The non-transitory computer-readable medium of claim 7, wherein the one or more instructions, when executed by the at least one processor, further cause the at least one processor to:
confirm an infection of an endpoint system based on incorporating the one or more transformed persistent artifacts and based a response from an infection verification pack (IVP) tool.

12. The non-transitory computer-readable medium of claim 7, where the one or more instructions, when executed by the at least one processor, further cause the at least one processor to:
quarantine the second malware object based on detecting the second malware object.

13. The non-transitory computer-readable medium of claim 7, where the one or more instructions, when executed by the at least one processor, further cause the at least one processor to:
run a virtualized or emulated environment; and
monitor behavior of data within the virtualized or emulated environment.

14. A method, comprising:
performing, by a device, behavior detonation by executing a file object in one or more virtual environments;
extracting, by the device, feature values from one or more behavior traces generated from performing the behavior detonation;
sending, by the device, the feature values to a machine learning model;
identifying, by the device, the file object as a first malware object based on sending the feature values to the machine learning model;
selecting, by the device, one or more persistent artifacts generated in the one or more virtual environments as a result of the execution of the file object in the one or more virtual environments based on one or more algorithms applied to behavior traces of the first malware object,
the one or more persistent artifacts including one or more of:
information identifying a creation of a file, or
information identifying an addition of a registry key;
transforming, by the device, the one or more persistent artifacts into a form to detect a second malware object in another device using a different operating system,
the one or more persistent artifacts, before being transformed, having a first mapping of an application data path, and
the one or more transformed persistent artifacts having a second mapping of the application data path,
the second mapping corresponding to the different operating system; and
incorporating, by the device, the one or more transformed persistent artifacts into a set of instructions to be executed on the other device using the different operating system.

15. The method of claim 14, further comprising:
incorporating, into a program, one or more algorithms, which when run on any endpoint system along with the one or more transformed persistent artifacts, produce a confirmed or an unconfirmed output.

16. The method of claim 14, wherein transforming the one or more persistent artifacts into the form includes:
transforming the one or more persistent artifacts into a form of one or more specification lines.

17. The method of claim 14, wherein transforming the one or more persistent artifacts includes:
transforming the one or more persistent artifacts into a form of at least one new file.

18. The method of claim 14, further comprising:
detecting the second malware object on the other device based on incorporating the one or more transformed persistent artifacts.

19. The method of claim 18, where detecting the second malware object on the other device comprises:
detecting same application specific data in different directories.

20. The method of claim 14, further comprising:
confirming an infection of an endpoint system based on incorporating the one or more transformed persistent artifacts.

* * * * *